(12) United States Patent
Knepler (10) Patent No.: US 7,890,209 B2
(45) Date of Patent: *Feb. 15, 2011

(54) METHOD OF LIMITING BREWER OPERATION TO AUTHORIZED SUBSTANCES

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 458 days.

This patent is subject to a terminal disclaimer.

(21) Appl. No.: 11/691,408

(22) Filed: Mar. 26, 2007

(65) Prior Publication Data

US 2007/0187425 A1 Aug. 16, 2007

Related U.S. Application Data

(63) Continuation of application No. 10/876,849, filed on Jun. 25, 2004, now Pat. No. 7,197,377.

(60) Provisional application No. 60/482,839, filed on Jun. 26, 2003, provisional application No. 60/508,765, filed on Oct. 3, 2003, provisional application No. 60/560,792, filed on Apr. 7, 2004.

(51) Int. Cl.
*G06F 17/00* (2006.01)
(52) U.S. Cl. ................. 700/237; 700/232; 700/241; 705/76
(58) Field of Classification Search ......... 700/231–244; 705/76
See application file for complete search history.

(56) References Cited

U.S. PATENT DOCUMENTS

| | | | |
|---|---|---|---|
| 4,884,212 A * | 11/1989 | Stutsman | .................... 700/237 |
| 5,718,163 A | 2/1998 | Termini | |
| 5,842,603 A | 12/1998 | Schroeder et al. | |
| 5,974,950 A | 11/1999 | King | |
| 6,117,471 A | 9/2000 | King | |
| 6,238,721 B1 | 5/2001 | Knepler | |
| 6,333,692 B1 | 12/2001 | Andersen et al. | |
| 6,444,961 B2 | 9/2002 | Clothier et al. | |
| 6,465,035 B1 | 10/2002 | Knepler | |
| 6,479,086 B1 | 11/2002 | Knepler | |

(Continued)

FOREIGN PATENT DOCUMENTS

DE 10116239 10/2002

(Continued)

OTHER PUBLICATIONS

Taylor Company Advertising/ Specification Brochure C903, Jul. 2003.

*Primary Examiner*—Gene Crawford
*Assistant Examiner*—Michael K Collins
(74) *Attorney, Agent, or Firm*—Barnes & Thornburg LLP (57) ABSTRACT

A method, apparatus and system for preventing unauthorized equipment usage that involves providing equipment, such as beverage making equipment, to a customer. Authorized product is provided to the customer in packaging that has a technological measure attached. The equipment includes a technological measure reader to read information from the technological measure to set the equipment to perform an authorized number of food or beverage making cycles. An authorization deactivator may also be provided in association with the equipment to erase, decrement, or otherwise prevent the technological measure from being reused.

14 Claims, 6 Drawing Sheets

U.S. PATENT DOCUMENTS

| | | | |
|---|---|---|---|
| 6,705,106 B1 * | 3/2004 | Cunha et al. | 62/342 |
| 6,990,391 B1 * | 1/2006 | Cunha et al. | 700/237 |
| 7,032,818 B2 | 4/2006 | Thomas et al. | |
| 7,197,377 B2 * | 3/2007 | Knepler | 700/237 |
| 2002/0048621 A1 | 4/2002 | Boyd et al. | |
| 2002/0134831 A1 | 9/2002 | Saveliev et al. | |
| 2005/0015348 A1 * | 1/2005 | Knepler | 705/76 |

FOREIGN PATENT DOCUMENTS

| WO | WO 03/005295 | 1/2003 |
|---|---|---|

* cited by examiner

METHOD OF LIMITING BREWER OPERATION TO AUTHORIZED SUBSTANCES

CROSS-REFERENCE TO RELATED PATENT APPLICATION

This patent application is a Continuation of co-pending patent application No. 10/876,849, filed Jun. 25, 2004, which claims the benefit of U.S. Provisional Patent Application No. 60/482,839, filed Jun. 26, 2003; U.S. Provisional Patent Application No. 60/508,765, filed Oct. 3, 2003; and U.S. Provisional Patent Application No. 60/560,792 filed Apr. 7, 2004. The disclosures set forth in the referenced provisional applications are incorporated herein by reference in their entirety, including all information as originally submitted to the United States Patent and Trademark Office.

BACKGROUND

It is known practice for sellers of beverage products to provide beverage equipment to offices and the like for making beverage product. The buyer does not purchase the equipment, but rather receives the equipment at no charge or a relatively small charge. The seller recovers the cost of providing the equipment, and in many situations maintenance of the equipment, through the sale of product in an office coffee service program ("OCS program". The seller loses profit if the customer uses the equipment to make beverages with product outside of the OCS program, i.e. not purchased from the seller, ("unauthorized product". This is known in the industry as "customer cheating" or unauthorized equipment usage.

Usually the equipment manufacturer's name and in some situations an OCS providers name is displayed on the equipment. As a result, if the customer uses product from outside of the OCS program and the product is lower quality, these names can be tarnished in the mind of the consumer because it is now being associated with a lower quality product. It is desirable to have a method of monitoring an OCS program and the equipment to verify that only the intended OCS program product provided by the equipment provider (the "authorized product") is used. With such a method, customer cheating can be reduced or prevented.

The issues described above with regard to providing beverages, such as in an OCS program, occur in other product providing businesses. With the foregoing in mind, this issue should not be limited to discussion of OCS programs but should be considered expansively with regard to the provision of other food products and other products generally. It is envisioned that this situation may occur in other food product businesses such as vending whereby inexpensive, off-brand or inferior products might be offered or substituted.

In addition to possibly negatively impacting the name of the equipment manufacturer, it might also negatively impact the customer of the service, for example the party who engages the service to provide equipment at its facility. For example, many employers contract for these services and products, and the switching of products could tarnish the employers name in the eyes of its employees, (i.e. the employer is providing substandard products to its employees). In this regard, it is envisioned that the these problems occur in any situation in which product is provided and there is an opportunity to substitute another product.

The present disclosure relates to a method, apparatus, and system for preventing customer cheating in the office coffee services context. The term "office coffee services" is used for illustrative purposes only. The disclosed method, apparatus, and system is useful in any context where it is desirable for a product and services provider to monitor their customers to prevent customer cheating or unauthorized equipment usage. "Customer cheating" or "unauthorized equipment usage" includes any situation for example, in which a customer exceeds the number of authorized brews or uses an unauthorized product with the beverage equipment. Although this disclosure refers to brewing equipment and beverages, the present method, apparatus, and system is also applicable to equipment used to dispense other beverages, foods and products. For convenience, the terms "brewing equipment" and "brews" are used throughout this disclosure, although "dispensing equipment" and "dispensations" may be used in place of these terms and still be within the scope of this disclosure. Also disclosed is a kit for association with existing brewing equipment to provide such equipment with the functionality of the disclosed method, apparatus, and system.

The method may include a first step of providing equipment to a customer at a reduced cost or without direct charge. The equipment is designed or retrofitted to allow monitoring of the number of brewing cycles or some other measurable characteristic of the equipment related to use. Second, authorized product is provided to the customer. Authorized product is product which is authorized for the program and is associated with the system and equipment described below. The packaging or labeling of the authorized product contains at least one technological measure to identify the product as authorized product. The technological measures can also be read by or otherwise communicate with or provide information to the beverage equipment either directly or indirectly to authorize or activate a predetermined number of brewing cycles or other measurable characteristic. In a third step, the customer is only permitted to use the equipment to produce beverage when the predetermined number of authorized brewing cycles has not been exceeded or other measure has not occurred. The customer can reset or increase the number of authorized brewing cycles using new product packaging or other authorization mechanism.

The technological measures disclosed include but are not limited to the following: barcodes, radio frequency identification (RFID), carrier cards, magnetic stripes, magnetic cards, or other type of machine readable codes, indicia, numbers, characters, symbols, pictures or images, mechanisms, signals, structures, sounds, impulses, transmissions, devices or chips. The equipment may be designed to interfere, block, remove, erase, destroy, capture, catalogue, exhaust or otherwise cancel or prevent further use of the technological measure to prevent the customer from intentionally circumventing, copying or reusing the technological measure.

Additional features will become apparent to those skilled in the art upon consideration of the following detailed description of drawings.

BRIEF DESCRIPTION OF THE DRAWINGS

The detailed description particularly refers to the accompanying figures in which.

DETAILED DESCRIPTION OF THE DRAWINGS

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Terms including brewed, brewing, brewing substance, brewing liquid, and brewed beverage, beverage, and beverage making as used herein are intended to be broadly defined as including but not limited to the brewing of coffee, tea, herbs, and any other beverage. This broad interpretation is also intended to include, but is not limited to any process of infusing, steeping, reconstituting, diluting, dissolving, saturating or pass a liquid through or otherwise mixing or combining a beverage or food substance with a liquid such as water without a limitation to the temperature of such liquid unless specified. This broad interpretation is also intended to include, but is not limited to beverage or food substances such as ground coffee, tea, herbs, soup, liquid beverage or food concentrate, powdered beverage or food concentrate, freeze dried beverages or foods or other food concentrates to obtain a desired beverage or other food. Additionally, other forms of juice, tea and beverage concentrates and liquid, semi-liquid or gel form may be provided. The containers for such concentrates may be referred to as bag-in-box or BIB.

Figure 1:
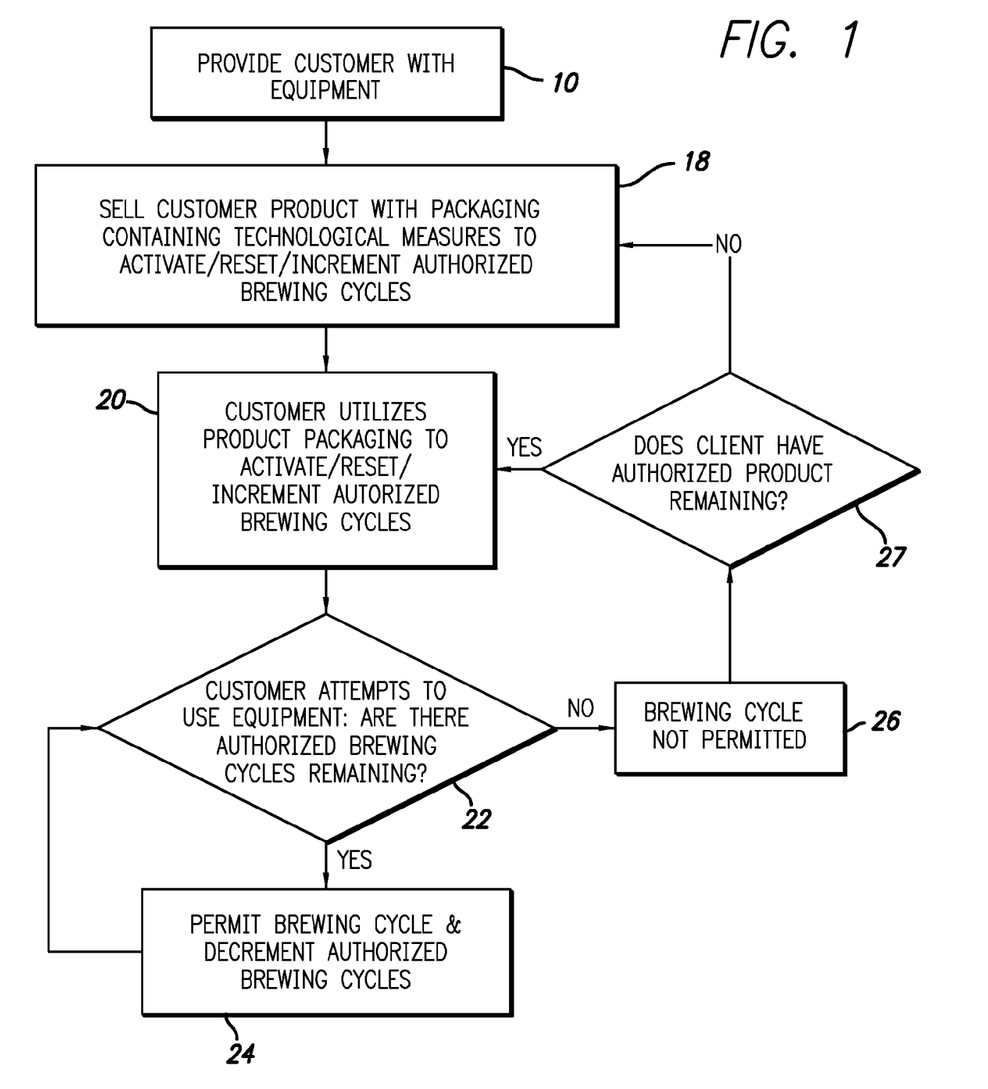
FIG. 1 is a simplified flow diagram view of a method for preventing unauthorized equipment usage.

With reference to the figures, FIG. 1. is a simplified diagrammatic flowchart showing steps to prevent unauthorized equipment usage. This method can be employed by office coffee services providers or vendors and the like. In a first step 10, the office coffee service vendor or provider, referred to as the "Vendor" hereinafter for convenience, provides a customer with beverage or food dispensing equipment ("equipment") 12 (see FIG. 2). The equipment 12 includes traditional mechanisms and structures for preparing and dispensing foods or beverages, these mechanisms and structures being hereinafter referred to as a "food dispensing portion" 13 of the equipment 12.

Figure 2:
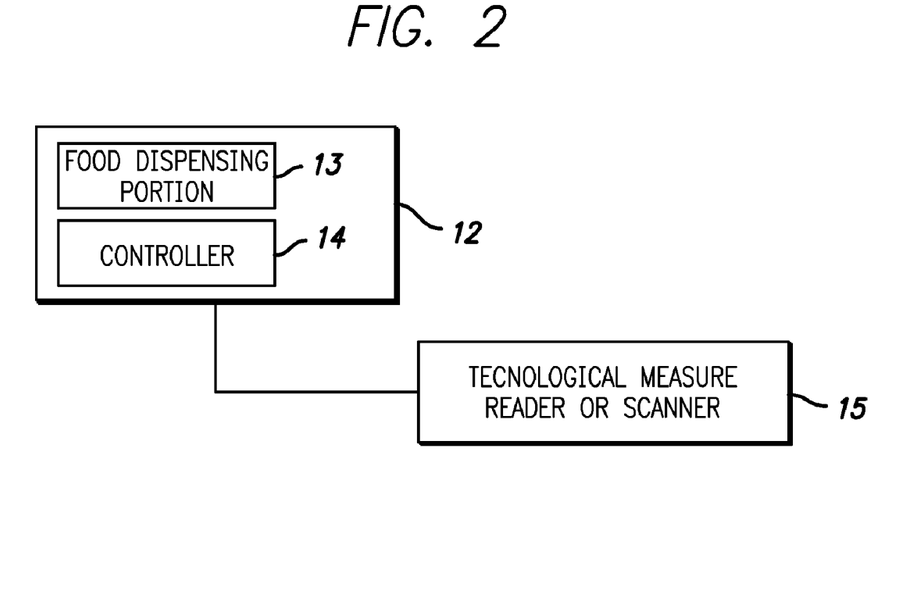
FIG. 2 is a simplified diagrammatic view of the components of equipment for use with the method of FIG. 1.

The equipment 12 is typically provided at low cost or at no charge such as, by way of example but not limitation, by a non-fee lease. In one business model, the Vendor does not plan to make a profit primarily from leasing or selling the equipment 12, but rather plans to recover the cost of the equipment 12 primarily though the sale of authorized product.

Referring to FIG. 2, equipment 12 includes a controller 14 electrically, controllably communicating with food dispensing portion 13. Controller 14 includes circuitry or programming to monitor the number of brewing cycles performed by the food dispensing portion 13 and also capable of shutting down or otherwise rendering the equipment 12 inoperable. A "brewing cycle" refers to one iteration of a brewing process that uses an amount of product found in one individually packed product packaging. For example, if the product is coffee, one individually packed product packaging would be one coffee packet, fractional package, can, brewing pod, automated brewer brewing cup, bag-in-box packaging, pouches, bags, capsules, or other such unit for producing beverages. In this scenario, one brewing cycle would be one iteration of using the coffee packet to make one volume, such as a cup or pot, of coffee which may include one or more servings. In an institutional or cafeteria setting, the brew size may be larger than one pot and may be as large as a multi-gallon server or reservoir. As another example, the result of a brew cycle for a single-cup coffeemaker would be a single cup of coffee. Any amount of product needed for a selected brewing cycle may used so long as the equipment is configured to monitor how many brewing cycles have been performed, how many products have been used or other measure of use.

Controller 14 also keeps an authorized brewing cycle count. The authorized brewing cycle count is a measure of use such as the number of authorized brewing cycles remaining and is automatically decremented whenever a brewing cycle is initiated, completed or otherwise indicated to have been performed. In an alternative embodiment, a technological measure can be used to perform the count monitoring functions described in the first embodiment to be performed by the controller 14. For the technological measure to monitor the authorized brewing cycle count, the technological measure may contain some type of volatile or rewriteable memory such as updateable flash memory, magnetic stripe memory, or inductive or conductive memory device. In such an embodiment, the controller 14 communicates with the technological measure to change the count thereon.

The equipment 12 is also fitted with a technological measure reader or scanner ("reader") 15 which is electrically connected and controllably operated by controller 14. Reader 15 may differ depending on the type of technological measure to be used with equipment 12. Equipment 12 may also be fitted with more than one reader 15 for compatibility with more than one technological measure. The reader 15 may be designed to prevent the technological measures from being rescanned, reused, or otherwise deceitfully used to cheat the Vendor. Various embodiments of reader 15 and corresponding technological measures are described in more detail below.

The current method utilizes equipment 12 described above in conjunction with a machine function enabler or technological measure contained on the authorized product's packaging or shipped with the authorized product. A technological measure is some device or code that when interpreted by or communicated to controller 14 through reader 15, adjusts the authorized brewing cycle count or otherwise enables operation of equipment 12. Packaging as used in this disclosure refers to the structure enveloping the authorized product for traditional shipping and identification purposes, and for some embodiments of the current method, apparatus, and system, for having embedded within the packaging a technological measure of the type described above. Specific forms of packaging include by way of example, but are not limited to coffee packets, bag-in-box packaging, fractional packs, cans, pods, pouches, capsule, bags, and single-serving containers.

The technological measure may also contain data or codes corresponding to other useful information about the product such as, for example, the Vendor's ID, recipes for one or more brewing parameters, passcodes, expiration dates, and so forth. Controlling the brewing process can therefore be improved by this method, apparatus, and system as well. The equipment may be configured to directly sense properties of the product itself. These properties may also be considered technological measures.

Referring back to FIG. 1, in a second step 18 of the disclosed method, the Vendor sells authorized product to the customer. The number of brewing cycles authorized by a particular product packaging may depend on how the product is packaged or shipped. For example, for a typical beverage, such as coffee, the grounds come from a roaster in sealed packages of predetermined weight. Each package may contain the proper measure of ground coffee to produce a given volume of finished brew. For instance, a package might contain two ounces of ground coffee to be used to produce 64 ounces of brewed beverage. The packages may be sold by the case with each case containing about 40-100 packages. A Vendor may program the packaging to include a number of extra authorized brewing cycles to account for setup, cleaning, and false start purposes.

In a third step 20 of the method, the customer uses the technological measures on or with the packaging to reset or increment the authorized brewing cycle count. Using the packaging descriptions above as an example, if the two ounce package contains a technological measure, that package can be read by reader 15 to increment the count by one brewing cycle. Alternatively, a forty container case may include a technological measure that increments the count by forty brewing cycles. As is evident from this example, any combination of packaging quantities and brew cycle increments can be used.

In a fourth step 22, each time the customer attempts to use equipment 12, controller 14 references the count to determine whether there are a sufficient number of authorized brewing cycles remaining to complete the brewing cycles requested. As shown in step 24, if there are brewing cycles remaining, the product is brewed and the count is decremented. If no authorized brewing cycles remain, the brewing cycle is not permitted as shown in step 26. As shown in step 27, if the customer has additional packaging containing unused authorized brewing cycles, that packaging can be scanned or read to reset or increment the authorized brewing cycle count. It should be noted that the product used need not be authorized product. Regardless of which product is used for a brewing cycle, the count is decremented. With this arrangement, the customer's incentive for using unauthorized product, whether it be price, or any other reason, is effectively removed. If the customer has no additional authorized product packaging remaining, new supplies of product must be ordered from the Vendor. Without the technological measure, the equipment will not function.

An application in which a concentrate is used, the concentrate may be, by way of example, but not limitation in the form of a juice concentrate container, coffee concentrate container, tea concentrate container or other concentrate container. Such concentrate containers may be loaded, for example, in the form of a cartridge into a dispensing machine. The technological measure can be carried on the container with reader 15 being carried on equipment 12. Placement of the container in the machine facilitates communication of the technological measure and reader 15. The technological measure can be programmed to accommodate a predetermined number of cycles and may have additional cycles programmed in the event of adjustments or concentration or other variables. Additionally, the reader 15 may function in any of the other forms described in this disclosure so that the system may erase the technological measure, or otherwise deactivate the technological measure at the conclusion of or exhaustion of the concentrate material. Similarly, the concentrate container such as in the form of a BIB may be located separate from equipment 12. Reader 15 associated with the dispensing equipment may be used to scan or otherwise read the technological measure. Reader 15 may function in any appropriate way to deactivate the technological measure at the conclusion of the pre-programmed dispensing cycles or upon reading of the technological measure. These additional examples as well as others contained in this description show the flexibility and diverse applications of the system set forth herein.

Figure 3:
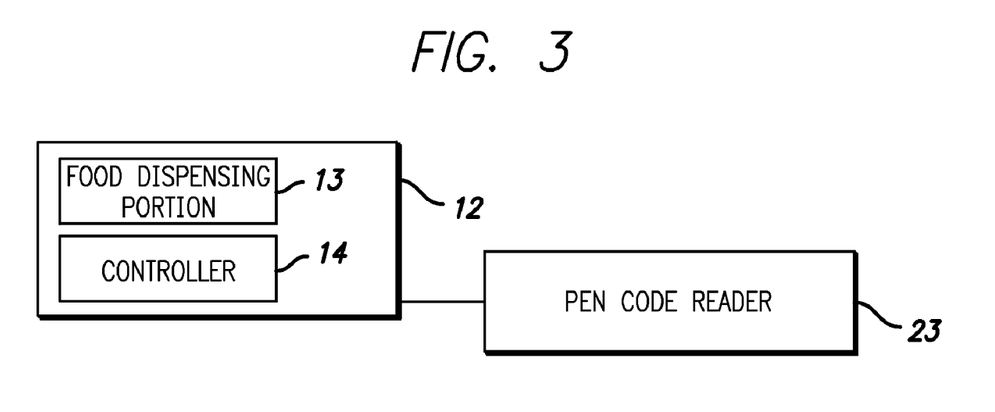
FIG. 3 is a simplified diagrammatic view of the equipment of FIG. 2 in communication with a pencode reader.
Figure 4:
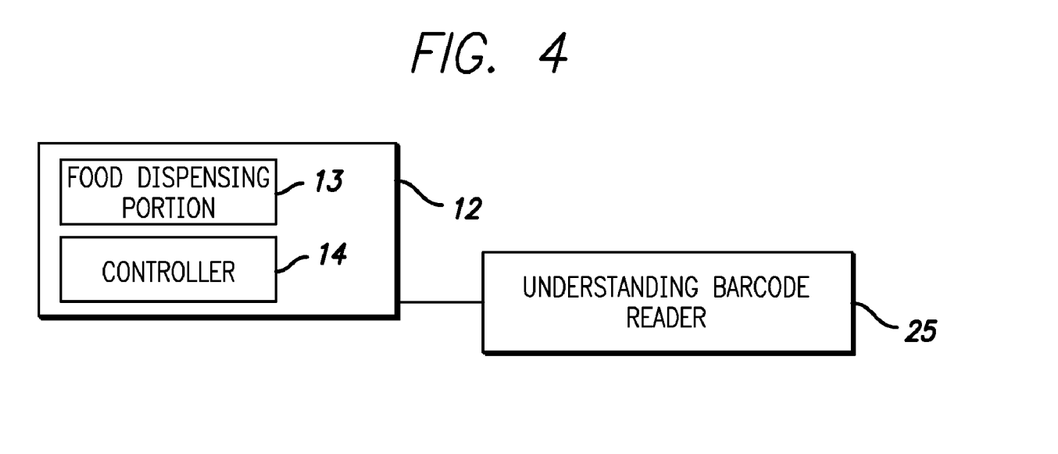
FIG. 4 is a simplified diagrammatic view of the equipment of FIG. 2 in communication with an upstanding barcode reader.

Various embodiments of technological measures can be used with the current method, apparatus, and system. One example is a bar code or other machine readable code on the authorized product packaging that can be read by a code reader embodiment of reader 15. Examples of code readers include the pen code reader 23 shown in FIG. 3 and the upright code reader 25 shown in FIG. 4. Another embodiment is a single preprogrammed RFID chip located within each case of product or accompanying the product on a carrier card, in which case reader 15 would be an RFID transceiver.

Figure 5:
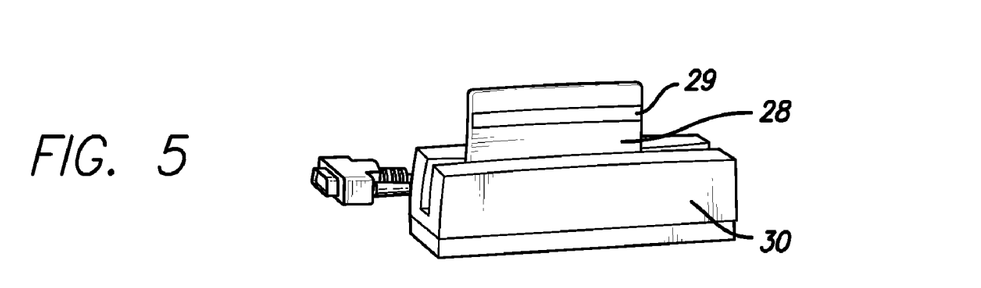
FIG. 5 shows one example of a slide type magnetic card reader.
Figure 6:
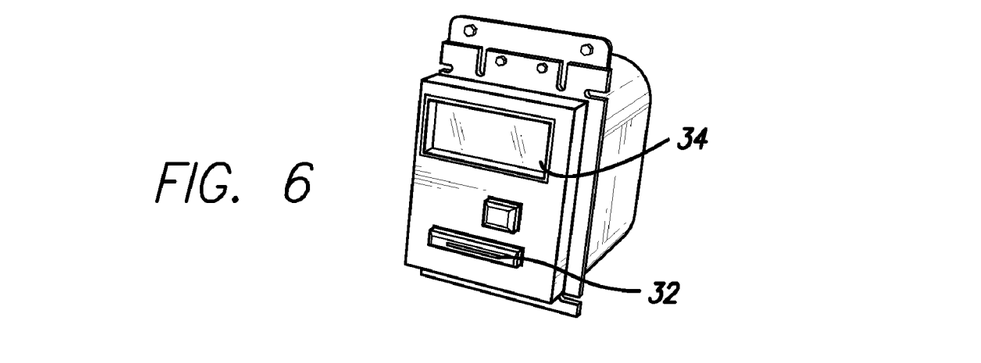
FIG. 6 shows one example of a card capture type card reader.

Alternatively, the technological measure can be a magnetic card 28 or magnetic stripe on product packaging which may be read with a reader for swiping magnetic cards 30 such as the reader shown in FIG. 5 or a reader for inserting a magnetic card 32 as that shown in FIG. 6, which optionally may include an LCD display 34 for displaying information stored on the card 28. The technological measure may also be a magnetic tag, which is capable of being manufactured or woven into product packaging.

The RFID chip or RFID chip/card combination can itself act as a counter to hold the authorized brewing cycle count which is capable of being accessed and updated by the controller 14 via the reader 15 when in electrical communication with the equipment 12. In this embodiment, the RFID chip is delivered with a selected number of authorized brew cycles programmed therein. The equipment 12 sends a signal to the RFID chip each time a brewing cycle is performed to decrement the number of authorized brewing cycles. The RFID chip can be returned to the Vendor to be reset when no authorized brewing cycles are left, or disposed of after use.

As discussed above, a technological measure may be a magnetic stripe 29. In either the barcode or magnetic stripe embodiments, the codes stored therein may be serialized so equipment 12 can keep track of the remaining authorized brewing cycles for multiple food or beverage product. This means that there may be multiple counters active within the brewer, each keeping track of the number of remaining authorized cycles for a given product associated with a given number. The counter to be decremented is determined by the serialized number read by the slide type scanner 30 or upstanding scanner 32 prior to initiating the brew cycle.

A problem associated with using technological measures is that such measures are subject to abuse by the customer. For example, if the barcode is on product packaging, and if the consumer is careful not to tear the barcode while opening the package, the barcode can be deceitfully rescanned. In order to combat such abuse, reader 15 may be configured to perform a "deactivating function" to interfere, block, remove, erase, destroy, capture, catalogue, exhaust or otherwise cancel, or capture, the technological measure after scanning or reading the technological measure. If configured to perform a deactivating function, the reader 15 may include an authorization deactivator to destroy or degrade the technological measure.

The following are several non-limiting illustrative examples of authorization deactivators. A laser in the barcode reader embodiment of the scanner may interact with the barcode ink causing the ink to no longer be readable. Alternatively, the deactivating function may be to punch a hole into a barcode or magnetic stripe embodiment of the technological measure to prevent reuse in which case the deactivating means would be a hole punch. In yet another embodiment, the technological measure may be covered until the reader 15 removes the covering to read the code. With this embodiment, the deactivating function would be to have code that was previously uncovered not be accepted by the reader 15. The authorization deactivation may also be a heating element to melt the technological measure or an actuateable blade for slicing or cutting the technological measure to prevent reuse. This authorization deactivator may be desirable when the blade is used both to open the packaging and to destroy the technological measure simultaneously.

Another example of a deactivating function is to have each read of the technological measure decrement the count of a number of authorized brews stored on a volatile counter on the technological measure. Additionally, equipment 12 can collect or capture the technological measure for preventing reuse by the customer. For example, the technological measure may be placed in a portion of the equipment 12 for reading by equipment 12. The location in equipment 12 may either stamp out, cut or otherwise collect the technological measure once it has been read prior to activation of equipment 12. The technological measure can act as a token or chip to cause activation of the machine. Alternatively, such a technological measure may be placed in the container or somehow attached to the packet so that it can be inserted by the user to perform the function. In such situations the technological measure could be in the form of a coin or other activation device.

Figure 7:
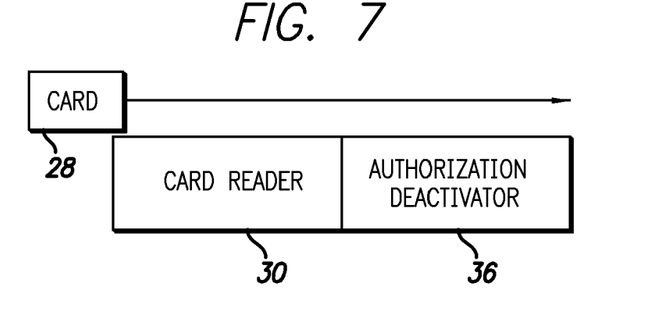
FIG. 7 is a simplified diagrammatic view of the card reader of FIG. 5 associated with an authorization deactivator.

With reference to the card reader embodiments 30, 32 of reader 15, an authorization information deactivator 36, as shown in FIG. 7, in association with card reader 30 or 32 may be used to write to, or erase information on, card 28. One example of an authorization deactivator 36 may be an electromagnet or other controllably operated magnet. As a magnetic card 28 is moved in direction shown by arrow 37, the authorized brewing cycle information stored thereon is both read, while passing by reader 30, and erased, while passing by authorization deactivator 36 in the form of an electromagnetic.

Card reader 30 may be configured to capture card 28 during processing such that card 28 may not be ejected until processing is complete. Although any size or configuration of card 28 may be used, one card standard that can be used with the current system is defined by ISO standards 7810-7813 related to financial transaction cards. Alternatively, card reader 30 may include a slot through which a portion of card 28 is passed during processing (see FIG. 5). In another embodiment, card reader 32 may be a slot into which at least a portion of the card is inserted (see FIG. 6). In such an embodiment, card reader 32 may include a clamping or capturing structure to at least partially hold card 28 during processing. One example of a card reader 30 that can be used is the Mag-Tek magnetic stripe reader from Raco Industries, although other readers may be used as well.

In one embodiment, reader 30 is configured to accept the information on the card if the card is moved sufficiently slowly to allow card 28 to be read such that all intended information stored thereon is transferred to controller 14. After card 28 is read, an associated electromagnet is activated to erase card 28. If card 28 is swiped too quickly, the swipe will neither be registered nor card 28 erased. Instead, the system will signal the user to swipe card 28 again. If the swipe or insertion occurs at a satisfactory rate, the information transferred from the card will be registered and card 28 erased.

Authorization information deactivator 36 may be positioned in such proximity to the card reader 30 so as to allow the information on the magnetic strip or other data carrying structure on the card to be deleted or modified using generally known methods, generally immediately after being read.

Reader 30 or 32 may be fixedly or removably attached to a controller 14 of equipment 12 via a communications path. Reader 30 or 32 may be generally fixedly attached to equipment 12, such as being positioned inside a cutout in the equipment's housing, in which case the communications path may be internal wiring. Alternatively, reader 30 or 32 may be removably or externally attached in which case the communications path may be any suitable electrical communications path including an RS-232 cable, USB cable, or a wireless communication signal using technology generally known in the art.

Figure 10:
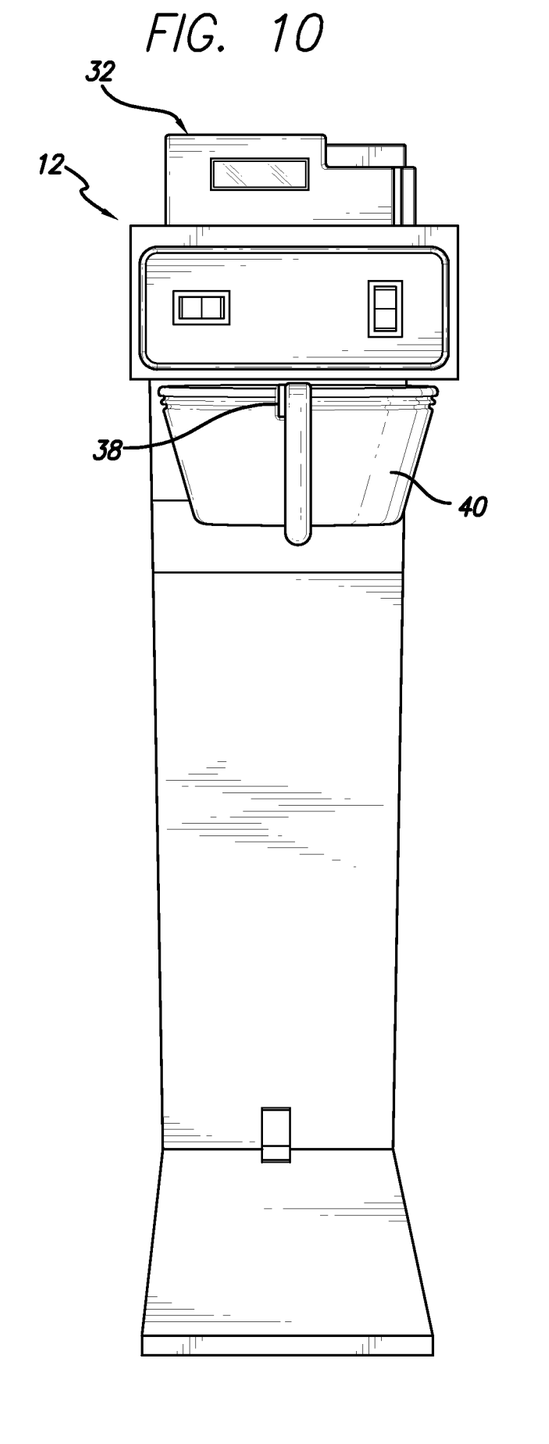
FIG. 10 shows beverage equipment with one example of a technological measure reader.
Figure 11:
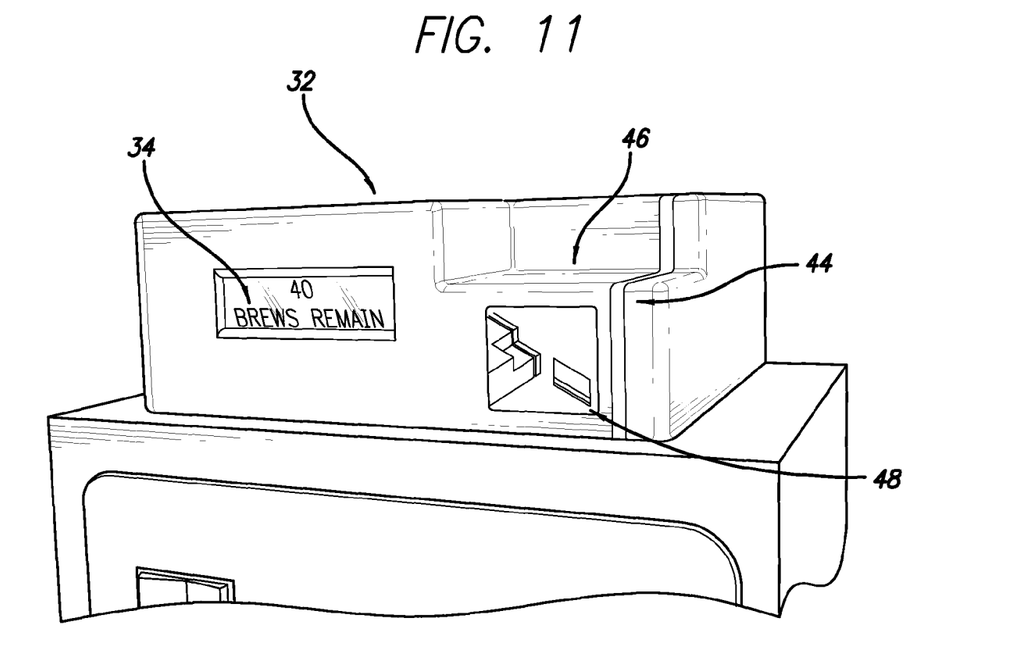
FIG. 11 is an enlarged view of the top of the equipment of FIG. 10 showing the technological measure reader.
Figure 12:
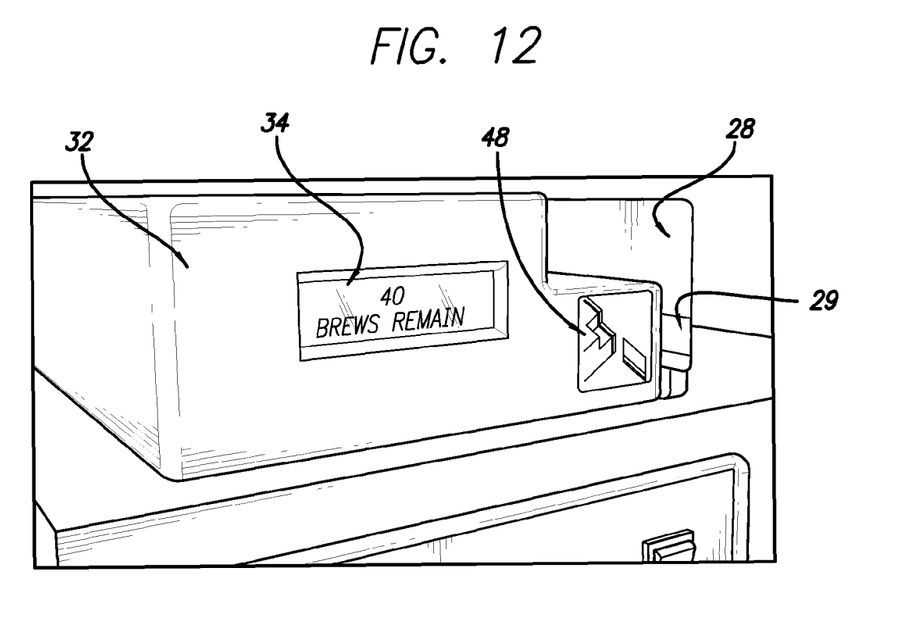
FIG. 12 shows the technological measure reader of FIG. 11 with a magnetic card inserted therein.

FIG. 10 shows one embodiment of equipment 12 in combination with an attached capture type reader 32. FIG. 11 focuses in on reader 32 which has LCD display 34. Display 34 may be dimensioned to provide a large, clear display to provide ample notification to the user of the number of authorized brewing cycles remaining. A card slot 44 is positioned along reader 32 to allow insertion of card 28. Reader 32 may have a cutout section 46 that creates an open area along the top portion of a card 28 when inserted to allow easy access and subsequent removal. Reader 32 may also include instructional indicia 48 showing, in simplified form, how to insert card 28. The embodiment shown in FIG. 11 connects reader 32 via internal wiring to equipment 12 and/or controller 14 positioned therein. Although this embodiment shows reader 32 being mounted to equipment 12, reader 32 may also be connected at some distance away from equipment either by a wire or using wireless technologies known in the art. FIG. 12 shows reader 34 with a card 28 positioned for being read. Card 28 is properly inserted because magnetic stripe 29 is aligned as shown in instructional indicia 48.

Controller 14 may be used to control one or more of the functions of equipment 12 including locking out operation such as preventing food dispensing portion 13 from powering on. Controller 14 may also be used to controllably lockout operation of one or more valves, such as an inlet valve, a valve that controls flow between a pour over basin and heating reservoir or passage, or an outlet valve. If equipment 12 is configured, or can be programmed, in the manner described above, to prevent operation when such valves are closed, controller 14 need only control one of these structures to effectively prevent operation of brewing equipment 12 in its entirety. Controller 12 may also operate a display on equipment 12 to signal to the user that equipment 12 is locked. This signal may be in any detectable form including a text message on a read out screen, or an illumination of a warning light. Other auditory, visual, and tactile signals may be used as well.

In another authorization card embodiment, equipment 12 will capture and retain card 28. Equipment 12 may include a cavity or storage space for collecting cards 28. An accumulation of cards 28 can be collected by the service personnel of the Vendor as they conduct their regular rounds servicing equipment 12, or delivering additional product, or at other times.

The technological measures may be positioned in various locations on or around the product and product packaging. As stated above, the technological measures may be printed or affixed to a case of authorized product or to individual authorized product packaging. The technological measures can take the form of a code on a RFID chip. In other embodiments of authorized product packaging, such as, coffee packets, fractional package, can, brewing pod, automated brewer brewing cup, bag-in-box packaging, pouches, bags, capsules, concentrate containers, powder containers, beverage pods, cartridges, barcodes, magnetic stripes, or RFIDs, the technological measure may be printed or affixed directly thereon.

The current method, apparatus, and system can be used with a variety of products including but not limited to beverage or food substances such as ground coffee, tea, herbs, soup, liquid beverage or food concentrate, powdered beverage or food concentrate, syrups, mixes, mixes (powdered or liquid concentrate) for making granita beverages, freeze dried beverages or foods or other food concentrates to obtain a desired beverage or other food. Additionally, other forms of juice, tea and beverage concentrates and liquid, semi-liquid or gel form may be provided.

Figure 8:
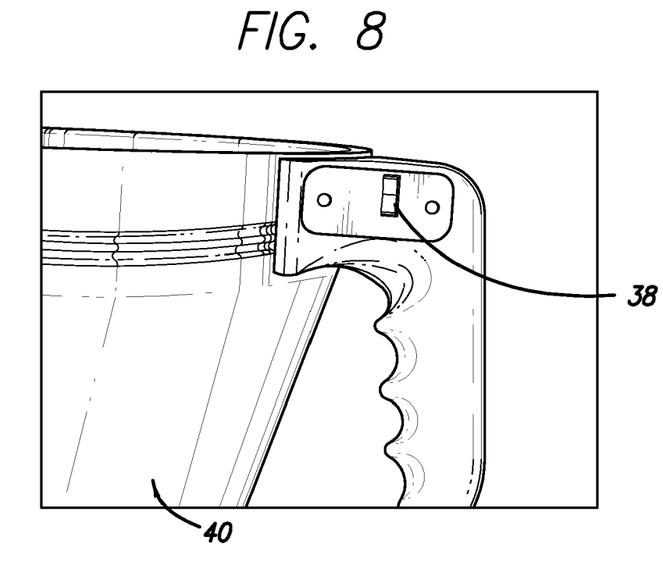
FIG. 8 shows a brewing funnel with a RFID chip.
Figure 9:
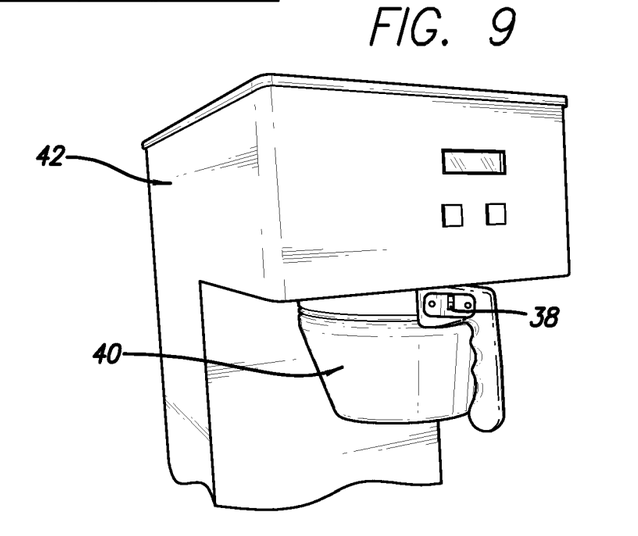
FIG. 9 shows the brewing funnel of FIG. 8 inserted into beverage making equipment.

The current method can also be used in conjunction with a dispenser-maker interface as disclosed in co-pending U.S. patent application No. 10/271,619 filed Oct. 14, 2002, and all related Patents including U.S. Pat. No. 6,465,035 issued Oct. 15, 2002, U.S. Pat. No. 6,238,721 issued May 29, 2001, and U.S. Pat. No. 6,479,086 issued Nov. 12, 2002, the disclosures of which are incorporated herein by reference. As shown in FIGS. 8-9, this system uses an RFID chip 38 in a funnel 40 of a coffee brewer/grinder 42 to communicate the coffee name and batch size to brewer/grinder 42. In one embodiment of this system, this information may be entered into the funnel RFID chip 38 by a companion grinder during the grinding process. In this embodiment, the funnel RFID chip 38 can be dual purpose; to activate or store a number of authorized brewing cycles and to communicate information from the grinder 42 to the funnel 40.

In another embodiment, equipment 12 may be any beverage making apparatus which utilizes a funnel or other vessel design for making beverage. The funnel may have a communication or coupling port for coupling to a technological measure such as an RFID chip. In this embodiment, the RFID is shipped with a selected number of brewing cycles corresponding to the number of brewing cycles used to process the product in that shipment with the possible additional allowances described above. In use, the RFID is coupled to the funnel at the port. Each brewing cycle performed decrements the brewing cycle count on the RFID. This process is repeated until the brewing cycle count is decremented to zero after which equipment 12 will no longer operate until the a new RFID with a non-zero count is connected to the funnel.

A system of the current disclosure is defined to include the equipment 12 or apparatus as described above in conjunction with product being shipped or having on the product's packaging, one or more of the technological measures described above. The system effectively monitors and prevents unauthorized equipment usage. It is envisioned that this system can be in communication with the Vendor via a communications networks such as the Internet so that a Vendor can monitor that customer's usage.

A kit may also be provided for association with existing equipment so that the equipment can be controlled in the manner described above. The kit may include a technological measure reader 15 that is put in direct or indirect communication with existing equipment. Technological measure reader 15 may include a retrofit part or add-on that may be associated with an equipment's existing controller to prevent unauthorized equipment operation. The retrofit may include, but is not limited to, adding a new controller module or component, updating an existing controller with the software module through any available programming method, including flashing a controller's memory, replacing a chip, replacing a circuit board, or copying and running software code on memory accessible to a controller's microprocessor. The software module may be included as part of a retrofit kit for updating existing equipment to include the functionality describe above. The term "module" referenced in this disclosure is meant to be broadly interpreted and broadly cover various types of software code including but not limited to routines, functions, objects, libraries, classes, members, packages, procedures, methods, or lines of code together performing similar functionality to these types of coding. The kit may also include one or more authorization deactivators to be put in association with the equipment and/or technological measure reader.

Controlling the equipment to prevent unauthorized equipment usage may also be implemented with the following method. The authorized brewing count may be monitored on a remote system in communication with equipment 12. As the customer orders authorized product, the authorized brewing count on the remote system is incremented accordingly. Subsequent equipment usage decrements the count on the remote system. The equipment 12 may only be operated while authorized brewing cycles remain. The step of ordering the authorized product may be considered the technological measure in this embodiment. The customer's incentive to purchase unauthorized product, as in the previously discussed embodiments, is removed because only the quantity of authorized product purchased controls the authorized brewing count.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A method for preventing unauthorized equipment usage comprising the steps of:

providing equipment to a user;

providing authorized beverage making product to the user for loading into the equipment, the authorized beverage making product being contained in packaging, the authorized beverage making product being accompanied by a technological measure associated with at least one of the packaging and the product, the technological measure being readable by the equipment to set a predetermined number of authorized beverage making cycles;

communicating the predetermined number of authorized beverage making cycles to the equipment; and permitting the equipment to be operated only while there are authorized beverage making cycles remaining.

2. A method for preventing unauthorized equipment usage of equipment that uses authorized beverage making product to be loaded into the equipment, machine readable information associated with the authorized beverage making product, the method comprising:
 communicating a predetermined number of authorized beverage making cycles to the equipment:
 permitting the equipment to be operated only while there are authorized beverage making cycles remaining:
 providing an authorization deactivator that is controllably operated by the equipment; and
 performing a deactivation function on at least a portion of the authorized beverage making product having machine readable information after the predetermined number of authorized beverage making cycles has been exhausted.

3. A method for preventing unauthorized equipment usage comprising the steps of:
 providing equipment to a customer;
 providing authorized beverage making product to the customer, the authorized beverage making product being accompanied by a technological measure, the technological measure being readable by the equipment;
 validating the authorized product;
 operating the equipment while the authorized beverage making product is validated; and
 in response to the authorized beverage making product losing validation, performing a deactivation function on the technological measure.

4. An apparatus for preventing unauthorized equipment usage unless an authorized beverage making product is loaded into the apparatus, the apparatus comprising:
 a food dispensing portion;
 a controller operatively associated with the food dispensing portion;
 a technological measure reader coupled to the controller for reading machine readable information associated with the authorized beverage making product;
 an authorization deactivator communicating with the controller for deactivating function of at least a portion of the authorized beverage making product having machine readable information;
 a predetermined number of authorized beverage making cycles being associated with the machine readable information and communicated to the apparatus to allow for operation only while there are authorized beverage making cycles remaining.

5. The apparatus of claim 4, further comprising the food dispensing portion being a beverage brewing apparatus.

6. The apparatus of claim 4, further comprising the technological measure reader being an RFID transceiver.

7. The apparatus of claim 4, further comprising the technological measure reader being a barcode reader.

8. The apparatus of claim 4, further comprising the technological measure reader being a magnetic stripe reader.

9. The apparatus of claim 4, further comprising the authorization deactivator being a device for operating the technological measure such that a counter on the technological measure is decremented.

10. The apparatus of claim 4, further comprising the food dispensing portion being a beverage making apparatus having a funnel, and the funnel having a port for connectively receiving an RFID chip to connect the RFID chip to the controller.

11. A system for preventing unauthorized equipment usage, the system comprising:
 an apparatus including a food dispensing portion, a controller, the controller electrically, controllably communicating with the food dispensing portion, and a technological measure reader, the technological measure reader electrically communicating with the controller;
 authorized food product for dispensing using the food dispensing portion, the authorized food product being contained in packaging, the authorized product being accompanied by a technological measure being one of in the packaging or on the packaging, the technological measure being capable of communication with the technological measure reader;
 the technological measure including information allowing operation of the apparatus for a predetermined number of authorized beverage making cycles;
 the controller operating the apparatus while there are authorized beverage making cycles remaining.

12. The system of claim 11, the authorization deactivator being a device for operating the technological measure such that a counter on the technological measure is decremented.

13. A kit for use with equipment to prevent unauthorized equipment usage, the kit comprising:
 a technological measure reader for use with the equipment, and a retrofit part for association with the equipment, the retrofit part being configured to prevent operation of the equipment by controllably operating one of the equipment or a controller of the equipment, the technological measure reader reading a technological measure carried on beverage making product used with the equipment;
 the retrofit part including a controller communicating with the technological measure reader;
 the technological measure reading the technological measure on the beverage making product used with the equipment to validate the authorized product;
 the equipment being operable while the authorized beverage making product is validated; and
 the controller terminating the operation of the equipment when the beverage making product validation expires.

14. The kit of claim 13, further comprising the retrofit part being selected from a group consisting of:
 a new controller module, a controller flash memory update, a replacement chip, and a replacement circuit board.

* * * * *